United States Patent [19]
Petrelis et al.
[11] Patent Number: 4,495,498
[45] Date of Patent: Jan. 22, 1985

[54] N BY M PLANAR CONFIGURATION SWITCH FOR RADIO FREQUENCY APPLICATIONS

[75] Inventors: Peter G. Petrelis, Huntington Beach; John A. Alexander, Rancho Palos Verdes, both of Calif.

[73] Assignee: TRW Inc., Redondo Beach, Calif.

[21] Appl. No.: 317,046

[22] Filed: Nov. 2, 1981

[51] Int. Cl.[3] ............................................ H04Q 1/00
[52] U.S. Cl. ............................ 340/825.79; 333/81 R; 330/124 R
[58] Field of Search ...................... 340/825.79, 825.91, 340/825.03; 333/100, 81 R, 101; 307/244; 357/41, 45; 455/133-140; 375/104; 328/105, 103, 153; 330/124 R, 53, 286, 124; 361/409, 410

[56] References Cited

U.S. PATENT DOCUMENTS 3,312,871 4/1967 Seki et al. ............................ 361/410
3,833,866 9/1974 Boutelant ....................... 340/825.79
3,924,206 12/1975 Fassett ............................ 333/81 R
3,963,993 6/1976 Hoffman et al. ................ 330/124 R
3,988,679 10/1976 Clarke et al. ........................ 375/104
4,121,183 10/1978 Murphy ............................ 333/81 R
4,129,839 12/1978 Galani et al. .................. 330/124 R
4,254,445 3/1981 Ho ...................................... 361/409

*Primary Examiner*—Donald J. Yusko
*Attorney, Agent, or Firm*—Robert W. Keller; Noel F. Heal

[57] ABSTRACT

A radio-frequency switch of planar construction for connecting N input signals to M output signals in a broadcast switch mode or a matrix switch mode. The switch includes a single substrate or circuit board (49) and M output switches (50) disposed in a row on one face of the board, each output switch having N input ports. In the broadcast mode, there are N rows of distributed power dividers (such as 60, 62, 64 and 66), each row providing M outputs from a single input port, the outputs being connected by conductors (such as 90) to the output switches (50). The conductors effecting these cross-connections are formed for the most part on the reverse face of the circuit board, to avoid intersection between the cross-connections and the distributed power dividers. In the matrix mode, the power dividers are replaced by switches (110).

22 Claims, 6 Drawing Figures

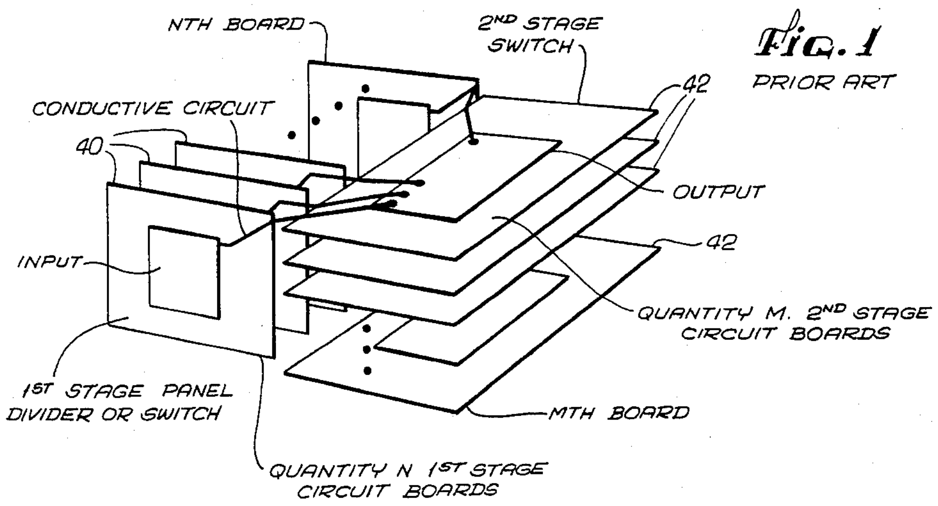
FIG. 1
PRIOR ART
FIG. 2
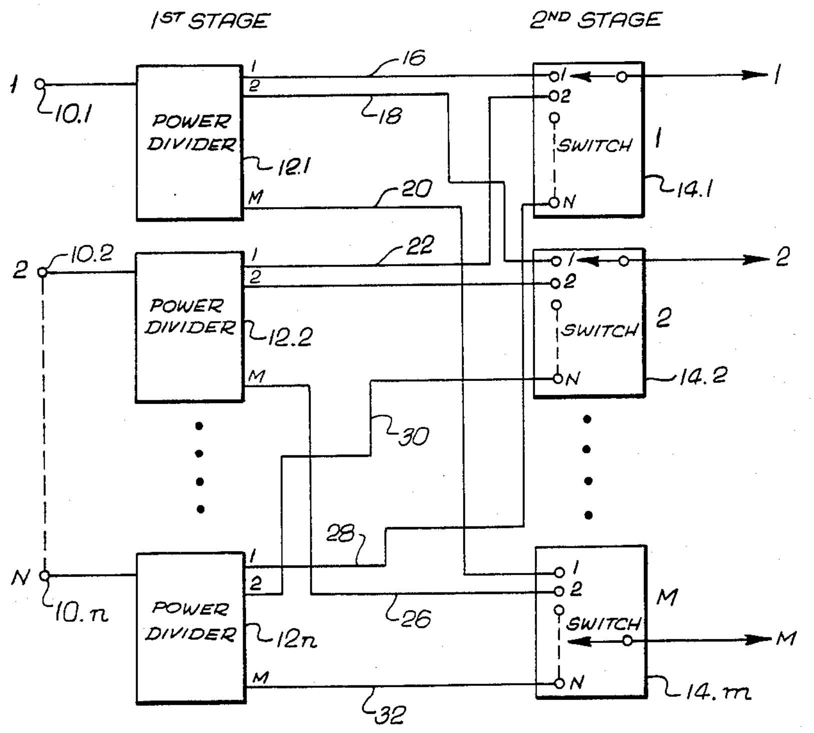

N BY M PLANAR CONFIGURATION SWITCH FOR RADIO FREQUENCY APPLICATIONS

BACKGROUND OF THE INVENTION

This invention relates generally to devices for switching radio-frequency signals, and, more particularly, to radio-frequency switching devices with the capability of selectively connecting a plurality of input circuits to a plurality of output circuits.

There are basically two switch configurations with which the invention is concerned. One will be referred to as the broadcast switch configuration, in which N input signals are applied to N corresponding input circuits and each input signal is to be "broadcast" to all of M output circuits. Each output circuit may select from among the N input signals. In the other configuration, referred to as the matrix switch configuration, the N input signals are connected to selected ones of the M output circuits. Regardless of which configuration is considered, a broadcast or matrix switch in general utilizes a large number of cross-connections, and for radio-frequency signals this poses a significant problem of possible interference and "cross-talk" between conductors.

One approach employed in the past to overcome this problem and to maintain sufficient isolation between the circuits has been to arrange the switch in the form of a three-dimensional array. In a first stage of the array there are N circuit boards arranged in a parallel spaced relationship along a first axis of symmetry through and perpendicular to the boards, each of which contains a power divider or switch for one of the input circuits. A second stage, or output stage, comprises M circuit boards also arranged in a parallel spaced relationship, but along a second axis of symmetry perpendicular to the first. In this arrangement, the connections between circuit boards can be made in such a manner as to maintain relatively good isolation between the circuits. However, an obvious drawback of the arrangement is that it is both cumbersome and inefficient in its use of space. Ideally, it would be desirable to fabricate such a switch on a single planar circuit board. However, known planar switches in the digital or telephonic arts are typically extremely complex and do not provide for the high degree of isolation that is necessary for radio-frequency communication. Accordingly, there is still a significant need for a broadcast or matrix switch configured on a single planar board and operable at radio frequencies with a high degree of intercircuit isolation. The present invention satisfies this need.

SUMMARY OF THE INVENTION

The present invention resides in a radio-frequency broadcast or matrix switch providing a high degree of isolation between signals, and yet configured on a single planar circuit board. Basically, and in general terms, the switch of the invention comprises a substrate, an output stage of M output switches, each having N input ports and a single output port, the M output switches being arranged in a relatively straight row on one face of the substrate. The invention further includes an input stage with N rows of cascaded power dividers or switches, the rows being parallel with the row of output switches, each of the N rows having a single input port and M output ports. Connecting conductors join the N×M output ports of the input stage to the N×M input ports of the output stage. To provide the necessary isolation, the output ports of the input stage are connected through the substrate to cross-connections made on its opposite face. If the substrate is a circuit board, the output ports of the input stage are "plated through" the board. All of the cross-connections are so arranged that none crosses any other, and any crossovers with respect to connections on the first face of the substrate or board are made in a perpendicular relationship to minimize interference between the two.

To further increase isolation and reduce the number of crossovers, half of the N rows of power dividers or switches in the input stage can be arranged on each side of the output stage, which is then aligned along an axis of symmetry of the substrate or board. In this arrangement, half of the input ports to the output switches which are arranged on one side of the output switches and half on the other side.

For further enhancement the isolation characteristics, a circuit board including an intermediate ground plane may be used, where the ground plane separates the switches on the first face from the cross-connections on the opposite face. Improved input port isolation can be achieved by physically staggering the input ports of the input stage along the axis of symmetry.

It will be appreciated from the foregoing that the present invention represents a significant advance in the field of broadcast or matrix switches for radio-frequency communication. In particular, the invention provides for the construction of switches of this type on a single planar circuit board, but without any significant sacrifice in isolation characteristics. Other aspects and advantages of the invention will become apparent from the following, more detailed description, taken in conjunction with the accompanying drawings.

BRIEF DESCRIPTION OF THE DRAWINGS

FIG. 1 is a simplified perspective view of a broadcast or matrix switch of the prior art;

FIG. 2 is a simplified block diagram showing the nature of a broadcast switch;

Figure 3:
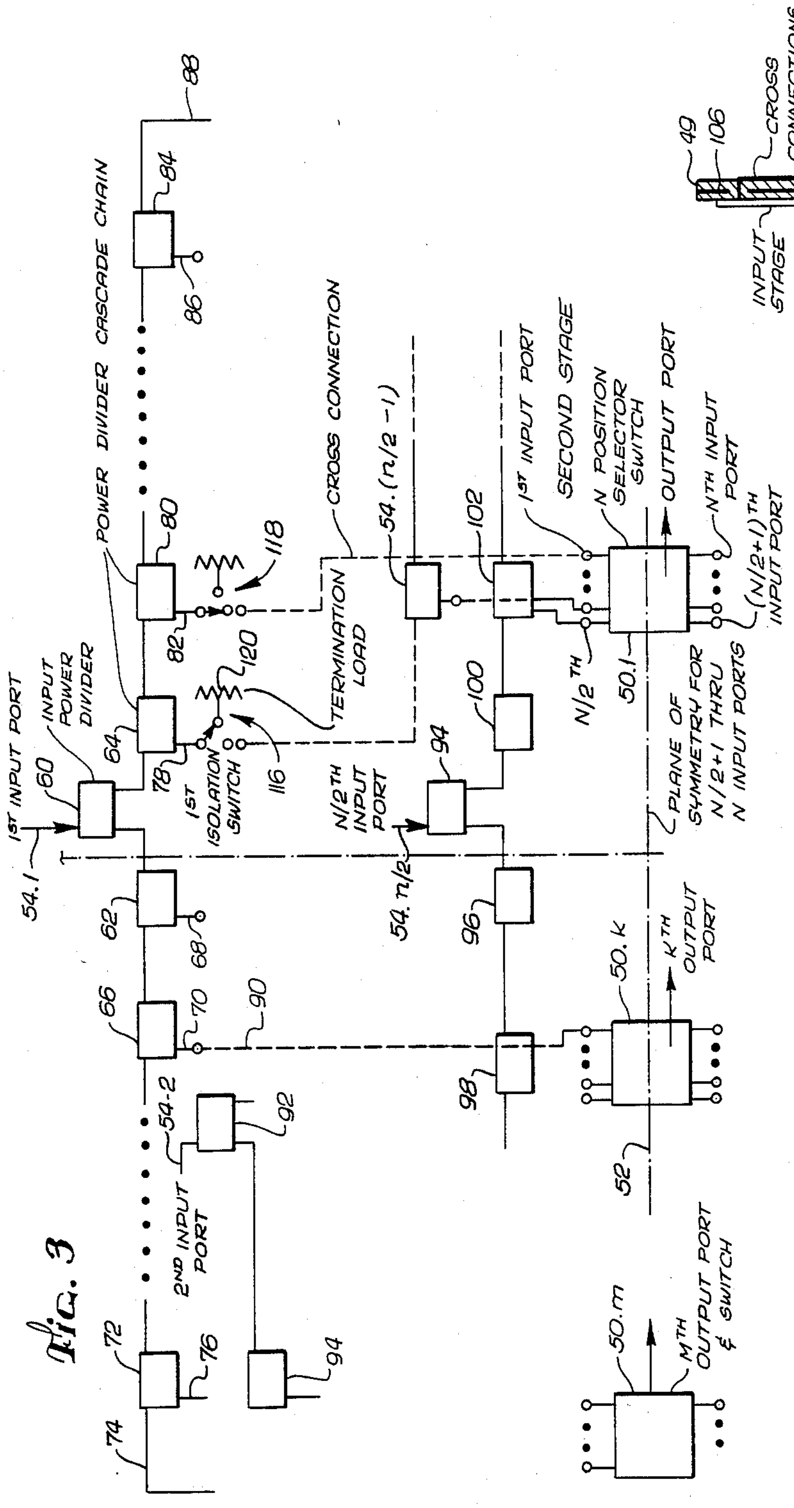
FIG. 3 is a simplified and fragmentary block diagram showing a matrix or broadcast switch in accordance with the invention, having N inputs and M outputs.
Figure 4:
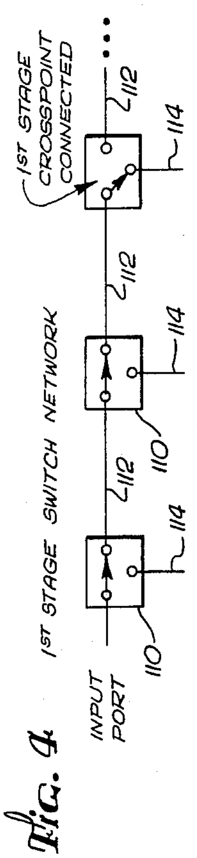
Figure 5:
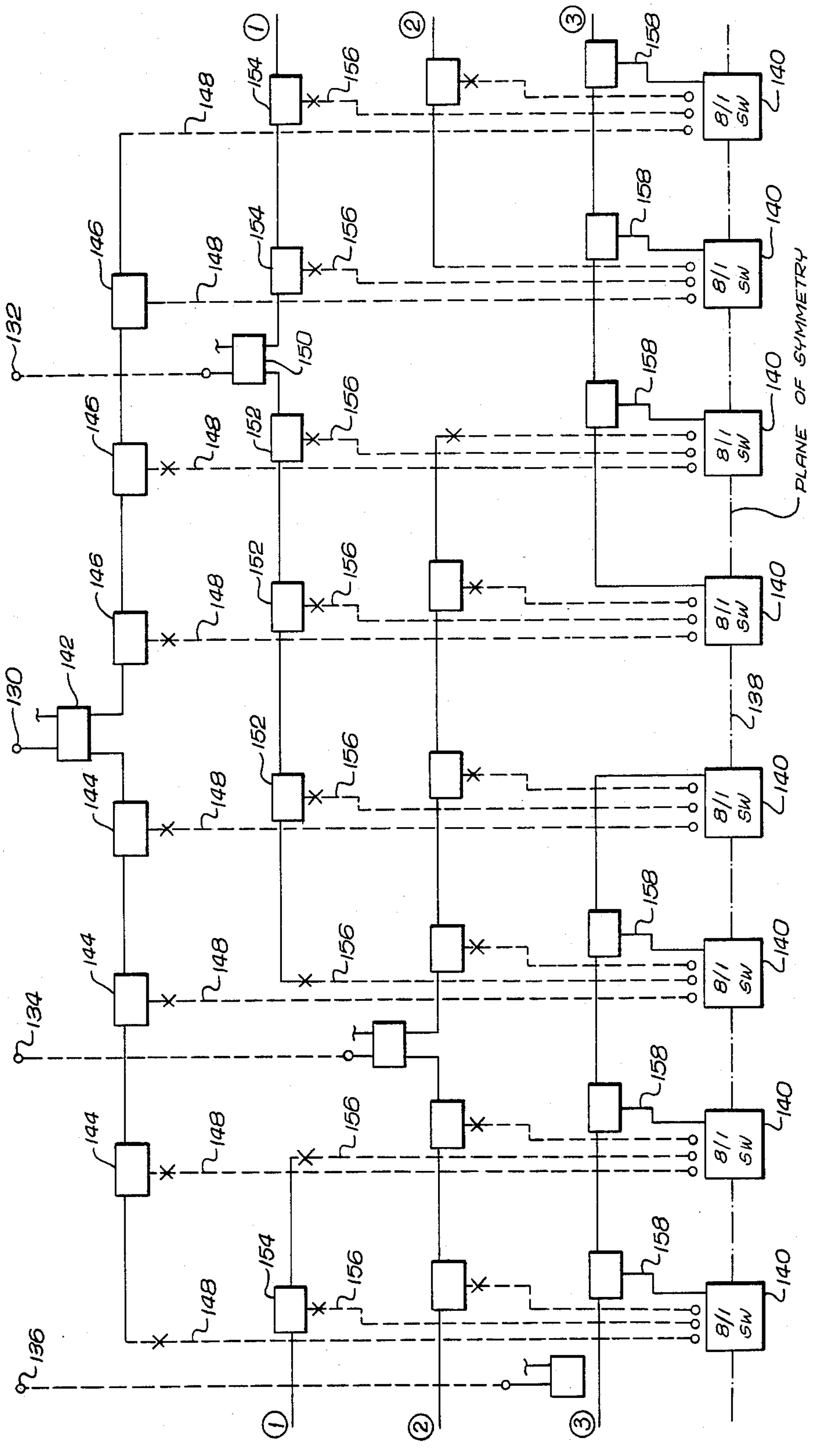

FIG. *3a* is a fragmentary cross-sectional view taken through a portion of the circuit board used in the invention;

FIG. 4 is a fragmentary block diagram showing a distributed switching arrangement that can be employed in the switch shown in FIG. 3 when used as a matrix switch; and FIG. 5 is a schematic diagram showing a broadcast or matrix switch in accordance with the invention, having eight input ports and eight output ports.

DESCRIPTION OF THE PREFERRED EMBODIMENTS

As shown in the drawings for purposes of illustration, the present invention is principally concerned with broadcast or matrix switches for operation at radio frequencies. The principles of such switches are illustrated for purposes of explanation in FIG. 2 of the drawings, in which there are shown N input ports, indicated by reference numerals 10.1 for the first, 10.2 for the second and 10.n for the last, N power dividers 12, and M output switches 14. Each of the power dividers 12 has M output ports. The first power divider 12.1 has its first output port connected by line 16 to the first input port of switch 14.1, has its second output port connected by line 18 to the first input port of switch 14.2, and so forth, the Mth output port being connected by line 20 to the first position of switch 14.m.

Similarly, the first output port of power divider 12.2 is connected by line 22 to the second input port of switch 14.1, the second output port of divider 12.2 is connected by line 24 to the second input port of switch 14.2, and the Mth output port of divider 12.2 is connected by line 26 to the second input port of switch 14.m. This arrangement continues down among the third, fourth and other power dividers (not shown) until the Nth power divider 12.n is reached. This divider has its first output port connected to the Nth input port of switch 14.1, as shown by line 28, its second output port connected by line 30 to the Nth input port of switch 14.2, and its Mth output connected by line 32 to the Nth input port of switch 14.M.

It will be seen from FIG. 2 that each of the N input signals is distributed by the power dividers 12 to input ports of all of the output the switches 14. The input signals are, in this manner, broadcast to all of the output-stage switches 14. Each switch 14 is capable of selecting one of its N inputs for use as an output. The matrix configuration of the switch requires only the replacement of the power dividers 12 by selector switches, such that the inputs 10 are selectively applied to the output switches 14, rather than being broadcast to all of them non-selectively.

In accordance with a prior art technique shown in FIG. 1, the problems posed by the intersections or crossovers of conductors, such as lines 16–32, between the input stage and the output stage, are minimized by arranging that the power dividers 10 are placed on an equal number (N) of input circuit boards 40, and the output switches 14 are arranged on M output boards 42. The input boards 40 are spaced uniformly along a first axis, and are disposed parallel with each other and perpendicular to the axis. The output boards 42 are also spaced in a parallel manner, but along a second axis at right angles to the first, such that one set of parallel edges of the input boards 40 are adjacent to a set of parallel edges of the output boards 43, but with one set of edges at right angles to the other. With this arrangement, all the connections from the first input board, for example, can be brought out as an array of connecting conductors practically coplanar or parallel with the board itself. These conductors can be connected to the first input ports of the switches in the output boards 42 without having to cross any two wires. Similarly, the second of the input boards 40 can provide outputs that do not intersect with the first set from the first board, and so forth. In this manner, the entire switch can be connected without intersection of the conductors, and consequently a desired degree of isolation is obtained. Unfortunately, however, the costs in terms of number of circuit boards and usage of space are substantial, and there is consequently a need for improvement in the design of coplanar boards implementing switches of this type, but still maintaining a high degree of isolation between the various conductive paths.

Figure 3A:
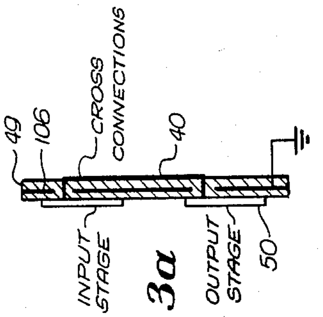

In accordance with the invention, the output switches are arranged along a relatively straight line on one face of a substrate, such as a circuit board, indicated at 49 in FIG. 3*a*, and the input stage power dividers or switches are arranged in lines parallel to the line of output switches. With this arrangement, cross-connections between the input stage and the output stage can be made on the reverse side of the circuit board and any crossovers of conductors are limited in number and may, in any event, always be arranged to be in a perpendicular configuration to maximize isolation.

It will be appreciated that the term "switch" in the context of this invention is intended to encompass solid-state switching devices such as FET amplifiers.

A generalized form of the invention is shown in FIG. 3, in which there are N output switches indicated by reference numerals 50.1, 50.2, and so on up to 50.m. Only three switches are shown in FIG. 3, namely 50.1, 50.k and 50.m. The switches 50 are arranged along a straight line 52, which in the preferred form of the invention is also an axis of symmetry of the circuit board 49 on which the components are formed. Each of the switches 50 has N/2 input ports arranged along one side of the switch and an equal number arranged along the other side, as will become more apparent as the description proceeds. The input stages are arranged half on each side of the axis of symmetry 52, to further minimize line crossovers and to maximize isolation.

For simplicity, only some of the input ports are shown in FIG. 3, namely the first input port 54.1, the second input port 54.2, the N/2 input port indicated as 54.n/2, and the input port one row before the latter, indicated at 54.(n/2-1).

Each input port 54 is connected to an input power divider which splits the input signal into two components, each of which is connected to a chain of further power dividers. More specifically, the first input port 54.1 is connected to a first input power divider 60, which splits the input power into two portions connected to two further power dividers 62 and 64. Power divider 62 further splits the power off to yet another power divider 66, and provides a terminal for cross-connection to the output switches 50, as indicated at 68. Power divider 66, in turn, provides another terminal 70 for cross-connection to the output switches 50, and connects to yet another power divider (not shown), and so forth until the last power divider 72 in the chain is reached, this one providing two outputs for cross connection to the output switches 50.

In similar fashion, divider 64 provides an output 78 for cross-connection to the output switches 50, and connects to another power divider 80, from which an output 82 is provided for cross-connection to the output switches. The power divider 80 connects with further power dividers in a sequential chain, the last one in the chain 84 providing two outputs 86 and 88 for cross-connection to the output circuits. Each of the output terminals, such as 68, 70, 76, 78, 82, 86 and 88, is connected through the circuit board 49 to cross connecting conductors formed on the reverse side of the board, as shown by way of example in FIG. 3*a*. These conductors are shown in broken lines in FIG. 3. For example, cross-connection 90 connects from the output terminal 70 from power divider 66 to the first input terminal of output switch 50.k. Similarly, each of the other output terminals related to the first input port 54.1, is connected to the first input port of one of the M output switches 50.

A second input port 54.2 is shown in fragmentary form as being connected to a power divider 92 which is chained to another power divider 94, and so forth. The outputs divide from these chains of power dividers derived from the second input port and provide outputs that are cross-connected to the second input terminal of each of the output switches 50. This arrangement continues through to the N/2th input port 54.N/2, to which are connected power dividers 94, 96, 98 and 100 and 102. These power dividers, as with those in the first input stage, provide outputs that are connected to the N/2th input ports of the M output switches 50, as shown by way of example by the connection 104. A similar arrangement of input ports and power dividers is present on the lower side of the axis of symmetry 52, making a total of N input ports. The lower half of input ports are connected to the lower set of terminals in the output switches 50.

It will be apparent that the arrangement shown in FIG. 3 results in cross-connections that are parallel and generally non-intersecting. Where intersections occur between cross-connections on the reverse face of the board 49 and connections to power dividers on the front face of the board, it can easily be arranged that these crossovers are made in a perpendicular manner, to minimize interference and maximize isolation of the circuits. Isolation can be further improved by the presence of a ground plane, indicated at 106 in FIG. 3*a*, disposed between the two faces of the circuit board 49.

The switch shown in FIG. 3 is basically a broadcast switch, wherein signals on each of the inputs is broadcast to all of the M outputs. However, the same distributed configuration can be employed for a matrix switch. Each of the power dividers would instead be replaced by a simple single-pole-double-throw switch, three of which are shown at 110 in FIG. 4. Each of the switches 110 is connected with its movable switching element connected to the input port, either directly or through other switches, one of its output terminals connected to the movable switching element of the next switch and the other of its output terminals, as indicated at 114, connected by an appropriate cross-connection to the output switches. The first two switches from the left in FIG. 4 are shown as being positioned to pass the signal through to the next switch, while the third switch is connected to pass the signal to a selected output switch.

A similar effect could be achieved by instead continuing to use the power dividers in each of the input stages but providing an isolation switch in the output terminals from the power dividers, as indicated by the illustrative switches 116 and 118 in FIG. 3. Switch 118 is shown in the normal position, to pass the output signal through to an appropriate cross-connection to the output switches. For the broadcast mode all such isolation switches would be in the position shown in switch 118. Switch 116 shows how an output is isolated by switching it to a termination load 120 rather than to a cross-connection to the output switches. Use of distributed switches such as are shown in FIG. 4 necessarily results in only one of the output switches 50 being selected by each input stage. In contrast, using the isolation switches such a 116 and 118 allows each input port to be connected to any number of output switches between 1 and M.

The configuration shown in FIG. 5 is a more specific example of a switch having eight inputs and eight outputs. A first input port is shown at 130, a second input port at 132, a third input port at 134 and a fourth at 136. It will be seen that the input ports are staggered in a direction parallel to the axis of symmetry 138, and that there are eight output switches 140 arrayed along the axis of symmetry. The first input port 130 is connected to a power divider 142, which splits power along a first chain of power dividers 144 and a second chain of power dividers 146. The power dividers 144 and 146 provide outputs for cross-connection to the first input terminal of the switches 140, as shown by the cross-connections 148. Similarly, the second input port 132 has its signal split at a power divider 150 along two chains of power dividers indicated by reference numerals 152 and 154. Outputs from dividers 152 and 154 are connected by cross-connections 156 to the second input terminal of the output switches 140. Similarly, the third input port 134 provides connections to the third input terminals of the switches 140, and the fourth input port 136 provides signals for cross-connection to the fourth input terminals of the switches 140. It will be noted that the fourth input port signal may be connected directly to the switches 140 on the same face of the circuit board as the switches themselves, as indicated at 158, since these cross-connections do not have to intersect any intervening input stages. It will be understood that there are four additional input circuits not shown in FIG. 5 arrayed on the opposite side of the axis of symmetry 138, and cross-connected to four input terminals on the lower side of the output switches 140.

It will be appreciated from the foregoing that the present invention represents a significant advance in the field of radio-frequency broadcast and matrix switches. In particular, it provides for an arrangement of switch components on a single circuit board, while still maintaining a high degree of isolation between the signals. It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A radio-frequency switch of planar construction for connecting N input signals selectively to M output circuits, where N and M are integers, said switch comprising:

- a substrate having first and second faces;
- an output stage having M output switches arrayed in a row on said first face of said substrate, each of said output switches having N input ports and one output port;
- an input stage having N input ports connected respectively to N power distribution means, each of said power distribution means having elements distributed on said first face of said substrate, along one of N rows practically parallel with said row of output switches, and each of said power distribution means having M output ports; and
- electrical conductor means connecting said output ports of said power distribution means with said input ports of said output switches, said conductor means being disposed on said second face of said substrate wherever necessary to avoid intersection with said power distribution means.

2. A radio-frequency switch as set forth in claim 1, wherein said N power distribution means are arrayed approximately half on one side of said output switches and half on the other side.

3. A radio-frequency switch as set forth in claim 1, wherein:

- said switch functions as a matrix switch; and
- said N power distribution means include M distributed switches providing an output at at least one of said M output ports.

4. A radio-frequency switch as set forth in claim 1, wherein:

said electrical conductor means on said second face of said substrate are disposed approximately at right-angles to said N rows in said power distribution means, to maximize isolation.

5. A radio-frequency switch as set forth in claim 1, and further including a grounded planar element fabricated with said substrate and located between said first and second faces thereof.

6. A radio-frequency broadcast switch of planar construction, for connecting N input signals to M output circuits, where N and M are integers, said switch comprising:

a circuit board having first and second faces;

an output stage having M output switches arrayed in a row on said first face of said circuit board, each of said output switches having N input ports and one output port and being able to connect a selected one of its input ports to its output port;

an input stage also disposed on said first face and having N input ports connected respectively to N distributed power dividers, each providing M outputs distributed in location along a line parallel to said row of output switches, whereby each of said M outputs is located as near as possible to a corresponding one of said output switches; and a plurality of conductors for cross-connecting said outputs from said distributed power dividers with said input ports of said output switches, said conductors being disposed for the most part on said second face of said circuit board to avoid intersection with said distributed power dividers.

7. A radio-frequency switch as set forth in claim 6, wherein said electrical conductors are disposed approximately at right-angles to said N lines of distributed power dividers, to maximize isolation.

8. A radio frequency switch as set forth in claim 6, and further including a grounded planar element fabricated with said circuit board and located between said first and second faces thereof.

9. A radio-frequency switch as set forth in claim 6, wherein said N distributed power dividers are arrayed approximately half on one side of said output switches and half on the other side, to minimize the number of intersecting electrical connections.

10. A radio-frequency matrix switch of planar construction, for selectively connecting N input signals to M output circuits, where N and M are integers, said switch comprising:

a circuit board having first and second faces;

an output stage having M output switches arrayed in a row on said first face of said circuit board, each of said output switches having N input ports and one output port and being able to connect a selected one of its input ports to its output port;

an input stage also disposed on said first face and having N input ports connected respectively to N distributed switching means, each providing M output terminals distributed in location along a line parallel to said row of output switches, whereby each output terminal is located as near as possible to a corresponding one of said output switches, each of said N distributed switching means providing an output signal at a selected one of its output terminals; and a plurality of conductors for cross-connecting said output terminals of said distributed switching means with said input ports of said output switches, said conductors being disposed for the most part on said second face of said circuit board to avoid intersection with said distributed switching means.

11. A radio-frequency matrix switch as set forth in claim 10, wherein the positions of said input ports to said distributed switching means are staggered with respect to each other.

12. A radio-frequency matrix switch as set forth in claim 10, wherein said electrical conductors are disposed approximately at right angles to said N lines of distributed switching means, to maximize isolation.

13. A radio-frequency matrix switch as set forth in claim 17, and further including a grounded planar element fabricated with said circuit board and located between said first and second faces thereof.

14. A radio-frequency matrix swtich as set forth in claim 10, wherein said N distributed switching means are arrayed approximately half on one side of said output switches and half on the other side, to minimize the number of intersecting electrical connections.

15. A radio-frequency switch of planar construction for connecting N input signals selectively to M output circuits, where N and M are integers, said switch comprising:

a substrate having first and second faces;

an output stage having M output switches arrayed in a row on said first face of said substrate, each of said output switches having N input ports and one output port;

an input stage having N input ports connected respectively to N power distribution means, each of said power distribution means having elements distributed on said first face of said substrate, along one of N rows practically parallel with said row of output switches, and each of said power distribution means having M output ports; and electrical conductor means connecting said output ports of said power distribution means with said input ports of said output switches, said conductor means being disposed on said second face of said substrate wherever necessary to avoid intersection with said power distribution means;

and wherein said radio-frequency switch functions as a broadcast switch, and said N power distribution means each include a plurality of power dividers connected in at least one distributed chain along one of the N rows, to provide M output ports for connection to said output stage.

16. A radio-frequency switch as set forth in claim 15, wherein:

said plurality of power dividers in each power distribution means include a first power divider to which one of the N input signals is connected, and having two output circuits, and first and second power divider chains receiving signals from said two respective output circuits and providing a total of M output circuits distributed along an axis at positions corresponding with locations of said output switches.

17. A radio-frequency switch of planar construction for connecting N input signals selectively to M output circuits, where N and M are integers, said switch comprising:

a substrate having first and second faces;

an output stage having M output switches arrayed in a row on said first face of said substrate, each of said output switches having N input ports and one output port;

an input stage having N input ports connected respectively to N power distribution means, each of said power distribution means having elements distributed on said first face of said substrate, along one of N rows practically parallel with said row of output switches, and each of said power distribution means having M output ports; and electrical conductor means connecting said output ports of said power distribution means with said input ports of said output switches, said conductor means being disposed on said second face of said substrate wherever necessary to avoid intersection with said power distribution means;

and wherein said switch functions as a matrix switch, said N power distribution means include M distributed switches providing an output at at least one of said M output ports, and each of said M distributed switches is capable of switching power to one of said N input ports to said output switches or to the next distributed switch in sequence.

18. A radio-frequency switch of planar construction for connecting N input signals selectively to M output circuits, where N and M are integers, said switch comprising:

a substrate having first and second faces;

an output stage having M output switches arrayed in a row on said first face of said substrate, each of said output switches having N input ports and one output port;

an input stage having N input ports connected respectively to N power distribution means, each of said power distribution means having elements distributed on said first face of said substrate, along one of N rows practically parallel with said row of output switches, and each of said power distribution means having M output ports; and electrical conductor means connecting said output ports of said power distribution means with said input ports of said output switches, said conductor means being disposed on said second face of said substrate wherever necessary to avoid intersection with said power distribution means;

and wherein said switch functions as a matrix switch, and said N power distribution means each include a plurality of power dividers connected in at least one distributed chain along one of the N rows, to provide M output ports for connection to said output stage, and M isolation switches connected to respective output ports to selectively isolate said output switches from the input signals.

19. A radio-frequency broadcast switch of planar construction, for connecting N input signals to M output circuits, where N and M are integers, said switch comprising:

a circuit board having first and second faces;

an output stage having M output switches arrayed in a row on said first face of said circuit board, each of said output switches having N input ports and one output port and being able to connect a selected one of its input ports to its output port;

an input stage also disposed on said first face and having N input ports connected respectively to N distributed power dividers, each providing M outputs distributed in location along a line parallel to said row of output switches, whereby each of said M outputs is located as near as possible to a corresponding one of said output switches; and a plurality of conductors for cross-connecting said outputs from said distributed power dividers with said input ports of said output switches, said conductors being disposed for the most part on said second face of said circuit board to avoid intersection with said distributed power dividers;

and wherein each of said N distributed power dividers includes a first power divider having an input terminal forming the input port, and two output terminals, and a plurality of further power dividers connected to said first power divider in at least one series string wherein each of said power dividers receives power from a preceding divider in said string and provides divided power to a next divider in said string and to one of said M outputs.

20. A radio-frequency switch as set forth in claim 19, wherein the positions of said first power dividers are staggered with respect to each other, and there are two series strings of power dividers connected to each first power divider.

21. A radio-frequency switch as set forth in claim 19 wherein:

said switch is also operable as a matrix switch; and said switch includes a plurality of isolation switches connected one in each of said electrical conductors to provide for selective connection of signals applied to said input ports to said output switches.

22. A radio-frequency matrix switch of planar construction, for selectively connecting N input signals to M output circuits, where N and M are integers, said switch comprising:

a circuit board having first and second faces;

an output stage having M output switches arrayed in a row on said first face of said circuit board, each of said output switches having N input ports and one output port and being able to connect a selected one of its input ports to its output port;

an input stage also disposed on said first face and having N input ports connected respectively to N distributed switching means, each providing M output terminals distributed in location along a line parallel to said row of output switches, whereby each output terminal is located as near as possible to a corresponding one of said output switches, each of said N distributed switching means providing an output signal at a selected one of its output terminals; and a plurality of conductors for cross-connecting said output terminals of said distributed switching means with said input ports of said output switches, said conductors being disposed for the most part on said second face of said circuit board to avoid intersection with said distributed switching means;

and wherein each of said distributing switching means includes a plurality of double-throw switches having an input terminal and two output terminals, one output terminal of each of said switches provides an output terminal for said distributed switching means and the other is connected to the input terminal of the next switch in a series string, and the positions of said switches determine which of the output terminals of said distributed switching means is connected to the input port of said output switches.

* * * * *